US006971010B1

(12) United States Patent
Abdel-Mottaleb

(10) Patent No.: US 6,971,010 B1
(45) Date of Patent: Nov. 29, 2005

(54) IMAGE AND VIDEO AUTHENTICATION SYSTEM

(75) Inventor: Mohamed Abdel-Mottaleb, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/419,671

(22) Filed: Oct. 15, 1999

(51) Int. Cl.[7] ............................. H04L 9/00; H04N 7/167
(52) U.S. Cl. ....................... 713/176; 713/188; 380/216
(58) Field of Search ............................. 713/176, 188; 380/216

(56) References Cited

U.S. PATENT DOCUMENTS 5,646,997 A * 7/1997 Barton ........................ 713/176
6,064,764 A * 5/2000 Bhaskaran et al. .......... 382/183

FOREIGN PATENT DOCUMENTS

| EP | 0367585 A2 | 5/1990 | ............ H04H 9/00 |
| GB | 2326048 A | 12/1998 | ............ H04N 1/32 |
| WO | WO9841017 | 9/1998 | ............ H04N 7/08 |

OTHER PUBLICATIONS

G.T. Wallace, "The JPEG Still Picture Compression Standard", Communications of the ACM, Apr. 1999, vol. 34, No. 4, pp. 31-44.
P.E. Mattison et al, "Practical Digital Video with Programming Examples in C", 1994, Chapter 11, pp. 373-393.
D. le Gall, "MPEG: A Video Compression Standard for Multi-Media Applications", Communications of the ACM, Apr. 1991, vol. 34, No. 4, pp. 47-58.

* cited by examiner

Primary Examiner—Gilberto Barron, Jr.
Assistant Examiner—Cas Stulberger

(57) ABSTRACT

An image authentication system utilizes a coded version of a digital image signature and embeds that information into a transform representation of the image. A digital image signature preferably is extracted from the image data. That signature is coded so that the signature is not immediately recognizable. The coded information is embedded into high frequency coefficients in a transform representation of the image. The contents of the high frequency coefficients of a received or later accessed signal can then be deciphered and compared to the signature determined directly from the image to authenticate the integrity of the signal.

16 Claims, 2 Drawing Sheets

IMAGE AND VIDEO AUTHENTICATION SYSTEM

BACKGROUND OF THE INVENTION

1. Field of the Invention

This invention generally relates to a system and method for authenticating image signals whether they are still images or part of motion picture video. A system designed according to this invention provides a digital signature unique to the image and embeds coded information corresponding to that signature into a transform representation of the image.

2. Description of the Related Art

Digital imaging is being used at an increasing rate. Two standards for handling compressed digital image information include JPEG, which is typically used for still images, and MPEG, which is typically used for motion picture video.

The JPEG compression standard is described in "The JPEG Still Picture Compression Standard", by Gregory T. Wallace, Communications of the ACM, April 1991, vol. 34, No. 4, pp. 31–44, which is incorporated into this specification by reference.

The MPEG standard is commonly used for motion picture video compression. MPEG is described in Practical Digital Video With Programming Examples In C, by Phillip E. Mattison, John Wiley and Sons, 1994, chapter 11, pages 373 through 393, and in "MPEG: A Video Compression Standard for Multi-Media Applications", by Didier Le Gall, Communications of the ACM, April 1991, vol. 34, no. 4, pps. 47 through 58, all of which are incorporated into this specification by reference.

As the use of digital imaging increases, the need for handling the image information in new ways also increases. One example is the need for image authentication in circumstances where the image information is used for surveillance or other situations where the integrity of a received image signal is critical. Whether image signals are captured and stored in memory for later observation or are transmitted over a network to a central location for real time observation, it is possible for unauthorized individuals to manipulate the stored images or to tamper with the signal being sent over the network.

While some attempts have been made to provide enhanced handling of image information, none has addressed the need for a secure authentication system. For example, the published application GB 2,326,048 discusses a system for embedding a digital watermark into compressed image data. The digital watermark, however, merely indicates copyright or other author identification information. The disclosure of that document does not include sufficient security measures to authenticate the content of an image signal.

Those skilled in the art have been endeavoring to develop new methods for ensuring the integrity of transmitted signals. One area where advances have been made is the derivation of a digital signature for an image based upon the image data. This invention utilizes a digital signature extraction method combined with embedding the digital signature information into a transform representation of the image. At a receiving location, the embedded information can be deciphered and compared with the expected image signature so that the integrity of the received signal can be verified.

SUMMARY OF THE INVENTION

This invention is useful for authenticating an image signal whether that signal is a still image or part of a motion picture video signal. The invention is most useful with compressed signal formats and provides a coded signature embedded into a transform representation of the image that corresponds to the content of the image so that the authenticity of the image can be verified.

A system designed according to this invention is useful for authenticating an image signal. The system includes a transform module that generates a transform representation of the image. The transform representation includes high frequency coefficients. A signature extractor module generates a digital signature that is unique to the image because it is based upon the content of the image data. A signature embedding module assigns new values to the high frequency coefficients that correspond to the digital signature. In this way, a coded version of the digital signature is embedded into the transform representation of the image. The coded version of the digital signature can be deciphered at a receiving location and compared to the appropriate signature based upon the image data so that the authenticity of the received signal can be verified.

Another aspect of this invention is a method of authenticating an image signal that includes several basic steps. A transform representation of the image is generated. A digital signature unique to the image is determined, preferably by utilizing the image data information. The transform representation of the image includes high frequency coefficients that are identified. Then the high frequency coefficients are assigned new values that correspond to the digital signatures so that a coded version of the digital signature is embedded into the transform representation of the image.

Another aspect of this invention is to provide a computer readable medium having a plurality of computer executable instructions for authenticating an image signal. The computer readable medium designed according to this invention preferably includes a first program module that directs the computer to generate a transform representation of the image. The transform representation preferably includes high frequency coefficients. A second program module directs the computer to determine a digital signature unique to the image, preferably based upon the image data content. A third program module directs the computer to assign new values to the high frequency coefficients in the transform representation. The values assigned to the high frequency coefficients correspond to the digital signature. The assigned values in the high frequency coefficients are a coded version of the digital signature embedded into the transform representation of the image, which can be deciphered at a receiving location and compared to the image signature to authenticate the received signal.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
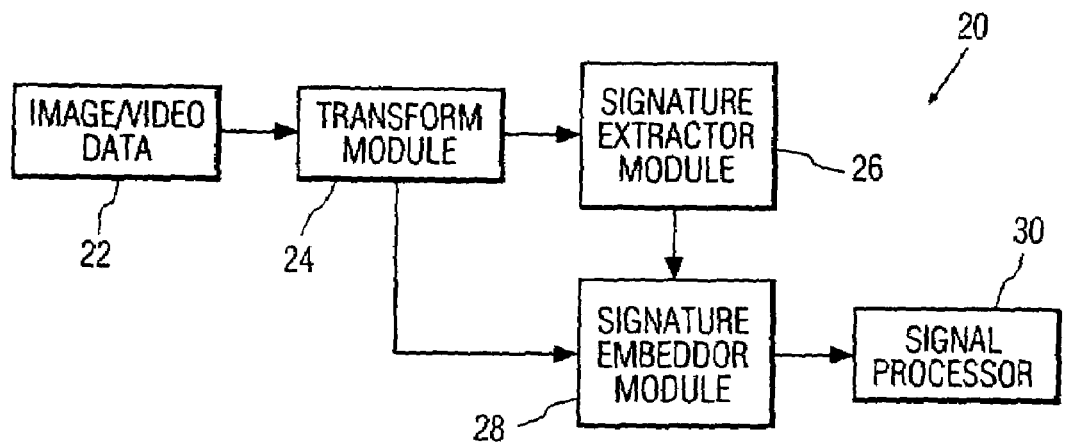
FIG. 1 schematically illustrates a system designed according to this invention.

FIG. 1 schematically illustrates a system 20 for authenticating an image signal that is useful whether the image corresponds to a still photograph or is a portion of a motion picture video signal. Image data is provided from a data source 22. A transform module 24 processes the image data as part of a data compression scheme. In the currently preferred embodiment, a discrete cosine transform is utilized as known in the art. Different transform algorithms used as part of data compression schemes are known in the art. The transform module 24 effectively generates a transform representation of the image.

The transform representation is provided to a signature extractor module 26 that determines a digital signature for the image. The digital signature preferably is based upon the content of the image data so that it is unique to the image. The currently preferred embodiment of this invention includes extracting an image signature by choosing a set of sub-images or windows from the image. The sub-images or windows can be samples of the image data such as JPEG blocks or multiple blocks, for example. Relationships between selected pairs of the windows or samples are then used to build a signature.

For example, an image is divided into 32 windows, divided into 16 pairs. Where a 16-bit signature is desired, each pair is assigned to one of the bits in the signature. A value is computed for each pair of data samples. An evaluation function is applied to each window of the image to compute a representative value of that window. The representative values are then used in a comparison and the result of that comparison is utilized to generate a bit value as part of the signature. For example, if the first window of a pair has a larger value than the second window and the difference exceeds a chosen threshold, the corresponding bit in the signature is assigned a digital value of zero. Alternatively, if the second window has a value larger than the first window by the chosen threshold, the bit value of the signature is set to one. The values of the windows can be determined using characteristics such as gray values, edge points, frequencies, variance of gray values, etc. The chosen characteristic may be varied depending on the needs of a particular situation.

More details regarding the currently most preferred method of extracting a signature from the image data are given in U.S. Pat. No. 5,915,038, the teaching of which is incorporated into this specification by reference. Other signature extraction or identification methods may be used according to the needs of a particular situation. Given this description, those skilled in the art will be able to choose the signature extraction strategy that best suits their needs.

Once the digital signature is extracted, it is provided, along with the transform representation of the image, to a signature embeddor module 28. The digital signature preferably is coded in a secret manner and embedded into the transform representation of the image. The signature embeddor module 28 preferably accesses high frequency coefficients in the transform representation of the image and assigns a new value to those coefficients that corresponds to the values of the digital signature bits.

Once the coded signature is embedded as desired, the image signal is handled by a signal processor 30 according to the needs of a particular situation. For example, the signal processor 30 could place the image information into memory or transmit it to a second location, for example.

It should be noted that although individual modules are illustrated in FIG. 1 for discussion purposes, this invention is not limited to an arrangement with that number of separate components or devices. Those having the benefit of this description will realize that hardware, software and various combinations of the two can be utilized for performing the functions performed by the modules schematically shown.

Figure 2:
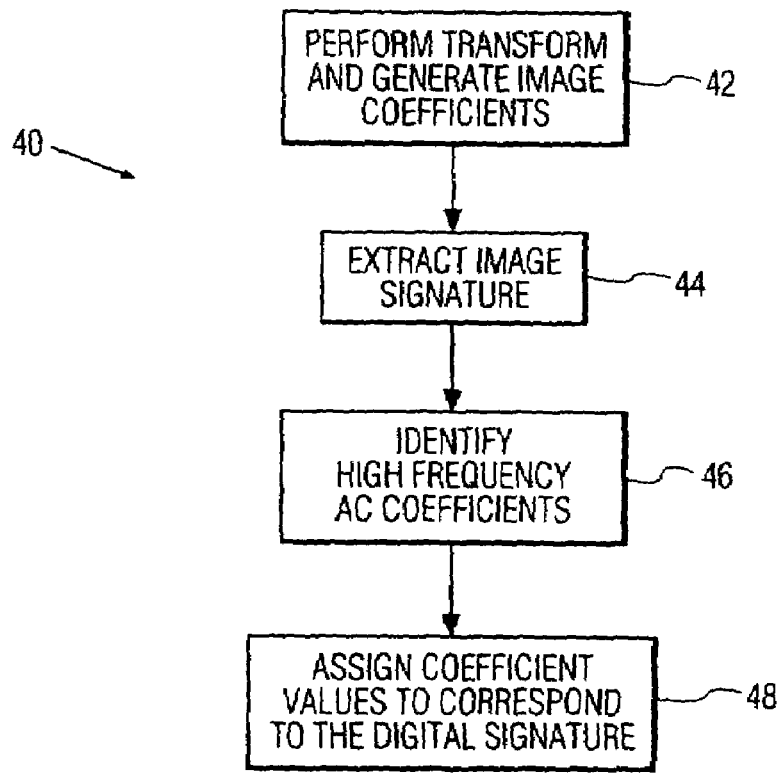
FIG. 2 is a flow chart diagram illustrating a method of this invention.

FIG. 2 is a flow chart diagram 40 that illustrates a preferred method of this invention. At 42, a preferably block-based transform procedure is performed to generate a transform representation of the image that includes high frequency coefficients. At 44, the image signature is extracted based upon the image data. At 46, the high frequency coefficients within the transform representation are identified. At 48, new coefficient values are assigned to the high frequency coefficients that correspond to a coded version of the digital signature. The steps illustrated in FIG. 2 preferably are performed at a sending location, for example. At a receiving location, the embedded, coded signature information is accessed or extracted from the high frequency coefficients and deciphered to determine the embedded digital signature of the received image. That signature is compared with a signature determined directly from the image. If the two signatures match, the received signal is verified and the image content can be considered authentic.

Figure 3:
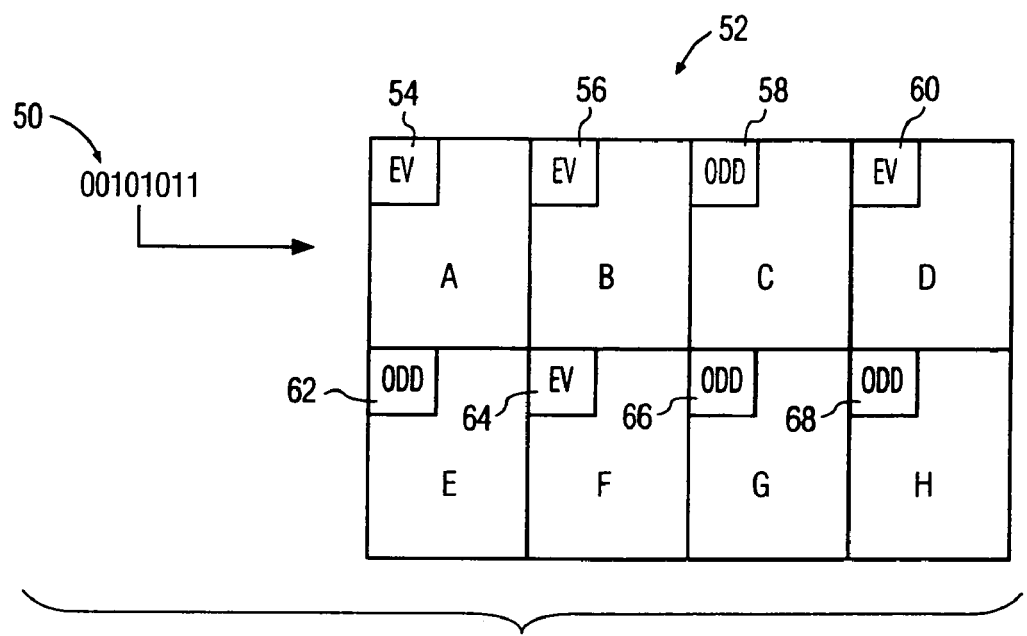
FIG. 3 is a schematic illustration of a preferred method of embedding signature information into a transform representation of an image signal.

FIG. 3 schematically illustrates a preferred method of embedding the coded signature information. A digital signature 50 is illustrated having 8 bits and is in a binary format so that each bit has a zero value or a one value. An image 52 is schematically illustrated having a plurality of blocks A through H. Each block includes at least one high frequency coefficient schematically illustrated at 54, 56, 58, 60, 62, 64, 66 and 68, respectively. Of course, the schematic illustration in FIG. 3 greatly simplifies a transform representation of an image as known in the art.

A code preferably is used to embed information into the transform representation of the image that corresponds to the digital signature. In one example, an even value number is embedded into a high frequency coefficient of a block to correspond to a zero value bit in the signature 50. Similarly, an odd value number is assigned to a high frequency coefficient that corresponds to a bit in the signature having a binary value of one. As shown in FIG. 3, the first bit of the signature 50 is a zero and the high frequency coefficient 54 is assigned an even value. Each of the high frequency coefficients illustrated correspond to one bit in the signature. It follows then, given the strategy mentioned above, that the high frequency coefficient 56 has an even value as do the high frequency coefficients 60 and 64. Each of the high frequency coefficients that correspond to a bit in the signature having a one value are assigned an odd number value. Accordingly, the high frequency coefficients 58, 62, 66 and 68 each have an odd number value.

Utilizing the high frequency coefficients in the transform representation of the image provides a convenient place to embed the coded signature information. The high frequency coefficients are typically associated with high frequency components in an image signal, which are typically considered noise and do not affect the perceived display of an image signal. Accordingly, altering the contents of the high frequency coefficients to include coded signature information is believed to not have any appreciable impact on the quality of the image that is ultimately provided.

In the example of FIG. 3, one bit per block is utilized to embed the coded signature information. It is preferred that at least one bit per block is utilized. Up to 64 bits (i.e., coefficients) per block can be used. It is important not to change the DC values of the transform representation of the image. Therefore, a minimum of one and a maximum of 64 high frequency coefficients are preferred for embedding the coded signature information.

Alternative coding strategies can be used. For example, multiple number values can be used in combination to correspond to each bit in the digital signature. Additionally, the digital signature can be repeated in the event that it contains less bits than there are blocks in a signature, for example. Having the coded signature repeated throughout an image provides a more robust arrangement that renders it more difficult for an unauthorized individual to alter the image signal.

Given this description, those skilled in the art will be able to develop the necessary software code to program a computer or microcontroller or to develop dedicated circuitry to perform the functions described above. Similarly, those having the benefit of this description will be able to choose from among commercially available components to develop a system that performs according to this description.

The preceding description is exemplary rather than limiting in nature. Variations and modifications to the disclosed embodiments may become apparent to those skilled in the art that do not necessarily depart from the spirit and basis of this invention. The scope of legal protection given to this invention can only be determined by studying the following claims.

What is claimed is:

1. A method of authenticating an image signal, comprising the steps of
    (A) generating a transform representation of the image;
    (B) determining a digital signature unique to the image;
    (C) identifying high frequency coefficients within the transform representation; and
    (D) assigning values to the high frequency coefficients to correspond to the digital signature, wherein the digital signature has a plurality of digits, the transform representation of the image includes a plurality of blocks that each have at least one high frequency coefficient and step (D) includes assigning a value to one coefficient in each block that corresponds to one of the digits of the signature; and
    wherein there are a greater number of blocks in the image representation than there are digits in the signature and step (D) further includes repeating the coefficient values corresponding to the signature a number of times such that each block includes a coefficient having a value corresponding to a signature digit.

2. The method of claim 1, wherein step (D) includes using a preselected pattern of coefficient values that is representative of corresponding values in the digital signature.

3. The method of claim 2, wherein the digital signature is a binary number having a plurality of digits, wherein each digit has a value that is either 1 or 0 and wherein the preselected pattern includes assigning a first number value to a coefficient that corresponds to a signature digit having a value of 1 and assigning a second number value to a coefficient that corresponds to a signature digit having a value of 0.

4. The method of claim 3, wherein the first number value is an even number value and the second number value is an odd number value.

5. The method of claim 2, wherein the digital signature is a binary number having a plurality of digits, wherein each digit has a value that is either 1 or 0 and wherein the preselected pattern includes assigning a first chosen number value to multiple coefficients that collectively correspond to a signature digit having a value of 1 and assigning a second chosen number value to multiple coefficients that collectively correspond to a signature digit having a value of 0.

6. The method of claim 5, wherein the first chosen number value is an even number value and the second chosen number value is an odd number value.

7. A system for authenticating an image signal, comprising:
    a transform module that generates a transform representation of the image that includes high frequency coefficients;
    a signature extractor module that generates a digital signature unique to the image; and
    a signature embedding module that assigns values to the high frequency coefficients that correspond to the digital signature, wherein the digital signature has a plurality of digits, the transform representation of the image includes a plurality of blocks that each have at least one high frequency coefficient and the signature embedding module assigns a value to one coefficient in each block that corresponds to one of the digits of the signature; and
    wherein there are a greater number of blocks in the image representation than there are digits in the signature and the signature embedding module repeats the coefficient values corresponding to the signature a number of times such that each block includes a coefficient having a value corresponding to a signature digit.

8. The system of claim 7, wherein each of the modules is embodied in a computer.

9. The system of claim 8, wherein each of the modules comprises software.

10. The system of claim 7, wherein the signature embedding module uses a preselected pattern of coefficient values that is representative of corresponding values in the digital signature.

11. The system of claim 10, wherein the digital signature is a binary number having a plurality of digits, wherein each digit has a value that is either 1 or 0 and wherein the preselected pattern includes a first number value for each coefficient that corresponds to a signature digit having a value of 1 and a second number value for each coefficient that corresponds to a signature digit having a value of 0.

12. The system of claim 11, wherein the first number value is an even number value and the second number value is an odd number value.

13. The system of claim 10, wherein the digital signal is a binary number having a plurality of digits, wherein each digit has a value that is either 1 or 0 and wherein the preselected pattern includes a first chosen number value assigned to multiple coefficients that collectively correspond to a signature digit having a value of 1 and a second number value assigned to multiple coefficients that collectively correspond to a signature digit having a value of 0.

14. The system of claim 13, wherein the first chosen number value is an even number value and the second chosen number value is an odd number value.

15. A computer readable medium having a plurality of computer-executable instructions for authenticating an image signal, comprising:

a first program module that directs the computer to generate a transform representation of the image that includes high frequency coefficients;

a second program module that directs the computer to determine a digital signature unique to the image; and a third program module that directs the computer to assign values to the high frequency coefficients to correspond to the digital signature, wherein the digital signature has a plurality of digits, the transform representation of the image includes a plurality of blocks that each have at least one high frequency coefficient and the assigning includes assigning a value to one coefficient in each block that corresponds to one of the digits of the signature; and wherein there are a greater number of blocks in the image representation than there are digits in the signature and the assigning by the computer further includes repeating the coefficient values corresponding to the signature a number of times such that each block includes a coefficient having a value corresponding to a signature digit.

16. The computer-readable medium of claim 15, wherein the third program module assigns values to the high frequency coefficients according to a preselected pattern such that the values assigned to the high frequency coefficients are decipherable to indicate the image signature.

* * * * *